United States Patent [19]

Glassman

[11] 4,277,648

[45] Jul. 7, 1981

[54] TELEPHONE MONITORING APPARATUS

[76] Inventor: David M. Glassman, 13 Gateway Cir., Rochester, N.Y. 14624

[21] Appl. No.: 144,200

[22] Filed: Apr. 28, 1980

Related U.S. Application Data

[63] Continuation-in-part of Ser. No. 971,231, Dec. 20, 1978.

[51] Int. Cl.$^3$ ............................................. H04M 15/38
[52] U.S. Cl. ................................ 179/7.1 R; 179/7 R; 179/8 A
[58] Field of Search .................... 179/7 R, 7.1 R, 8 R, 179/8 A, 7.1 TP, 175.2 R; 370/44

[56] References Cited

U.S. PATENT DOCUMENTS

| | | | |
|---|---|---|---|
| 3,546,381 | 12/1970 | Foley et al. | 179/7.1 R |
| 3,760,105 | 9/1973 | Puccini | 179/8 A |
| 3,806,652 | 4/1974 | Woolf et al. | 179/7.1 R |
| 3,825,689 | 7/1974 | Baichtal et al. | 179/8 R |
| 3,916,123 | 10/1975 | Werner et al. | 179/8 A |
| 4,066,843 | 1/1978 | Waks et al. | 179/7.1 R |

Primary Examiner—Gerald L. Brigance
Attorney, Agent, or Firm—Douglas Ian Hague

[57] ABSTRACT

Each telephone line of a telephone network is individually monitored to determine its on/off hook status and any control pulses or tones being impressed thereon. Each monitor unit when it has information to present generates a first interrupt signal which is fed to a block control unit. The block control unit in turn generates a second interrupt which is fed to a master control unit along with a binary value indicative of the interrupting monitor unit. When the master control recognizes a second interrupt, a CPU interrupt along with a second binary value indicative of the block unit generating the second interrupt is generated. The second binary value (1) provides a block select address signal that enables the interrupting block unit to present to a central processing unit (CPU) data indicative of the interrupting monitor and (2) provides to the CPU data indicative of the block unit to which the interrupting monitor belongs. Upon receipt of a CPU interrupt, the CPU reads at a specific memory address the binary data that is indicative of the interrupting monitor and then issues a read command to the interrupting monitor which presents its data to the CPU for processing in accordance with the CPU program.

4 Claims, 6 Drawing Figures

TELEPHONE MONITORING APPARATUS

This application is a continuation-in-part of Ser. No. 971,231, filed Dec. 20, 1978.

FIELD OF THE INVENTION

This invention relates to telephone systems and, more particularly, to apparatus for monitoring the activity of a plurality of lines of a telephone system.

BACKGROUND OF THE INVENTION

With the expanded use of telephones by both business and private users, many subscribers have developed the need, for billing and/or cost control purposes, to monitor the telephone activity on each of the lines of their telephone system. For the telephone subscriber with multiple telephone lines, but not a sufficient number of telephones to warrant the use of a PABX (Private Automatic Branch Exchange), the presently available monitoring systems usually require separate units for each telephone. Such systems are expensive and impractical since they require duplication of equipment for each telephone.

U.S. Pat. No. 3,806,625 to Woolf et al describes a telephone monitoring system having a plurality of monitors each connected in parallel to a separate telephone line to be monitored and communicating through parallel buss lines to a central record unit. Each monitor unit detects and decodes the telephone number dialed and performs all time-keeping functions. The central record unit sequentially polls each line and upon completion of the telephone activity sequentially retrieves from the line monitored the stored information for further processing, for example, storage or printing of the information regarding the telephone call. A principle drawback of the Woolf et al system is that the central record unit merely performs a polling function so that all logic and hardware for intelligence gathering must be located in each individual monitor unit. Each monitor unit, therefore, requires extensive intelligence gathering electronic circuitry. Furthermore, it would be extremely difficult to alter the Woolf et al monitor units so that they would accept dialed information without changing each individual telephone line circuit and the hard-wired data gathering device.

SUMMARY OF THE INVENTION

It is an object of the present invention to provide an improved telephone monitoring system in which the circuitry of each individual telephone monitor unit is kept to a minimum.

Another object of the invention is to provide an improved telephone monitoring system having wide flexibility with regard to installation and usage.

These and other objects are achieved in accordance with the present invention by telephone monitoring apparatus adapted for use with a central processing unit operative under an appropriate program including an interrupt service routine to process data presented thereto. The monitoring apparatus comprises a plurality of individual telephone line monitor units, and a control unit. Each telephone line monitor unit includes a detector connected to an individual telephone line for sensing the status of the line and for providing signal pulses whenever changes in the status occur, a temporary storage means responsive to the detector signal pulses for temporarily storing binary data representative of the change of status information and for providing a first interrupt signal indicating that a change in status has occurred, and a line-driver device for transferring the binary data from the storage means to the central processing unit. The control unit includes a priority encoder activated upon receipt of the first interrupt signal to produce binary data representative of that telephone monitor unit interrupting and to provide on an electrical connection to the central processing unit a CPU interrupt signal indicating that information from an individual telephone line is available and a line driver device for transferring the binary data from the priority encoder to the central processing unit. A control unit address decoder is responsive to a read command issued by the central processing unit in accordance with the interrupt service routine upon receipt of the CPU interrupt signal and enables the telephone line monitor unit and priority encoder line drivers to transfer the binary data from the storage means and the priority encoder to the central processing unit. In a preferred embodiment of the invention adapted to monitor up to about 256 telephone lines, the control unit comprises a master control unit and a plurality of block control units, each block unit being connected to 16 telephone line monitor units and to the master control unit. The block control units provide the low address bits to indicate the particular telephone line monitor unit which is interrupting and the master control unit produces the high order address bits of the interrupt address data to indicate the particular block control unit which is causing the interrupt. When the master control address decoder senses a request for data representative of the interrupt address data, it will enable the block control and master control line drivers to present this data to the central processing unit. The central processing unit uses this data to form a new address representative of the particular telephone line monitor unit interrupting. The central processing unit will then issue a read command to this address to obtain the information contained within the telephone line monitor unit. If desired, the system can be expanded beyond 256 telephone units by expanding the size of the priority encoders as explained in further detail hereinbelow.

The invention, its operation and its objects and advantages will become more apparent by referring to the accompanying drawings and to the ensuing Detailed Description of the Preferred Embodiment.

DETAILED DESCRIPTION OF THE PREFERRED EMBODIMENT

Figure 1:
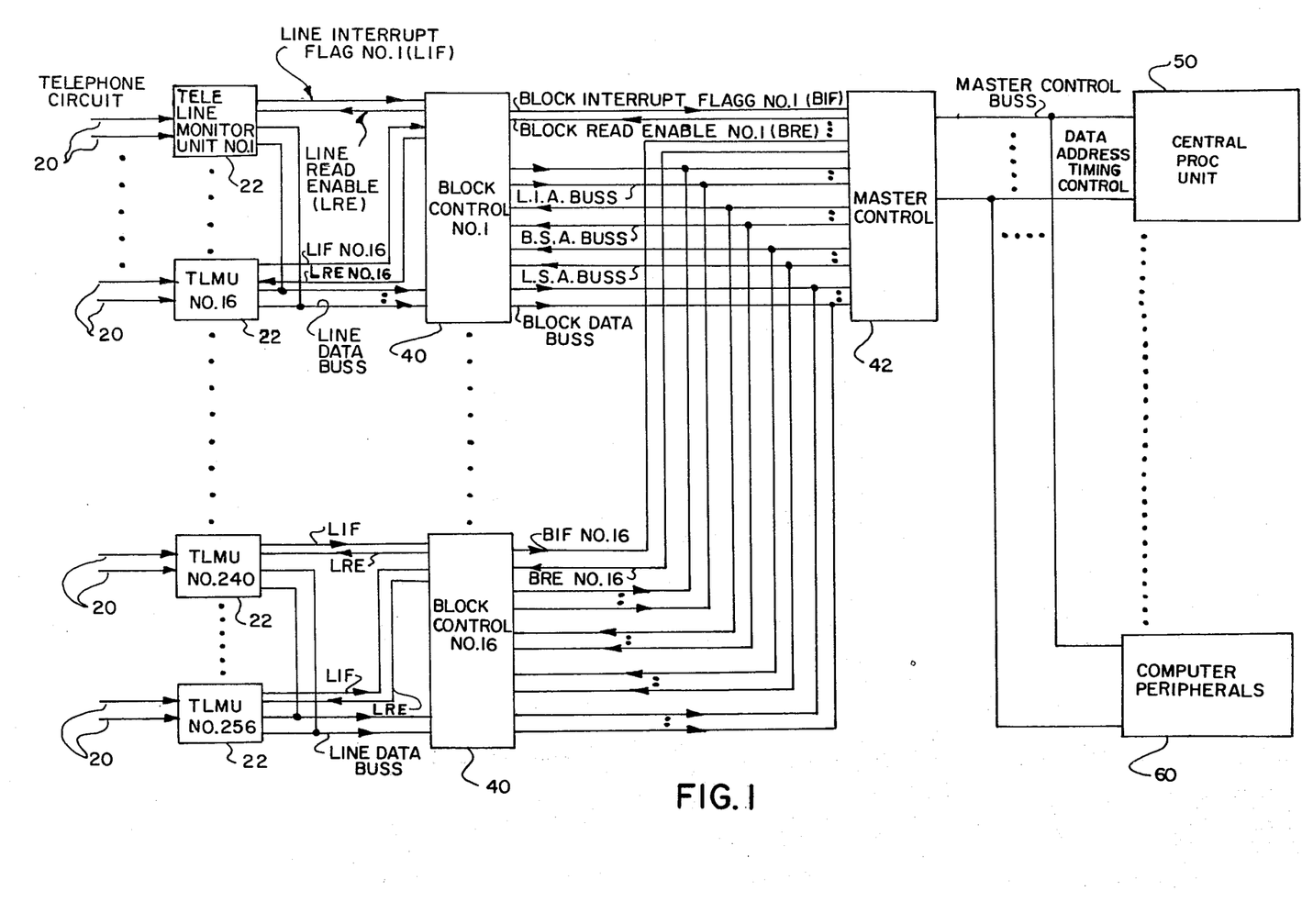
FIG. 1 is an overall block diagram of a telephone monitoring system incorporating the apparatus of the present invention.

With reference now to the drawings and particularly to FIG. 1, a brief overview of the operation of the monitoring system of the present invention is first presented. The overview is then followed with a more detailed explanation of the various components of the system. A multiplicity of telephone lines 20, are individually monitored by a corresponding multiplicity of telephone line monitor units (TLMU's) 22 to determine the circuit's on/off hook status and any control pulses or tones being impressed thereon. Each TLMU 22, when it has information to present to a central processing unit (CPU) 50, generates an interrupt signal, hereinafter called the first interrupt which is fed to a block control unit 40. Up to sixteen TLMU's 22 are attached to each block control unit 40. When the block control units 40 receive interrupts from the TLMU's, an interrupt signal hereinafter called the second interrupt, is generated along with a binary value indicative of that TLMU 22 generating the first interrupt to the block control unit. The second interrupt is passed to a master control unit 42. When the master control unit 42 recognizes a second interrupt, an interrupt signal, hereinafter called the CPU interrupt, is generated along with a binary value indicative of that block control unit 40 generating the second interrupt to the master control unit. This binary value is used for two purposes. One, to provide a block select address signal that enables the interrupting block control unit 40 to present to the CPU data buss a binary value representative of that TLMU 22 generating the first interrupt and two, to provide to the CPU data buss data representative of the block control unit 40 to which the TLMU 22 belongs. The CPU 50 upon receipt of a CPU interrupt, performs two operations under its program control. The CPU first reads at a specific memory address which has been assigned to the master control unit's address decoder those binary values generated as described above, that are representative of the particular TLMU 22 that is interrupting. The CPU 50 then issues a read command to a memory address as assigned to the master control unit's address decoder based upon the binary value representative of the interrupting TLMU. When this read command is recognized by the system, the interrupting TLMU 22 presents its data to the CPU data buss for processing in accordance with the CPU program. That TLMU 22 then releases its interrupt and any other TLMU is free to interrupt in accordance with a predetermined priority.

Figure 2:
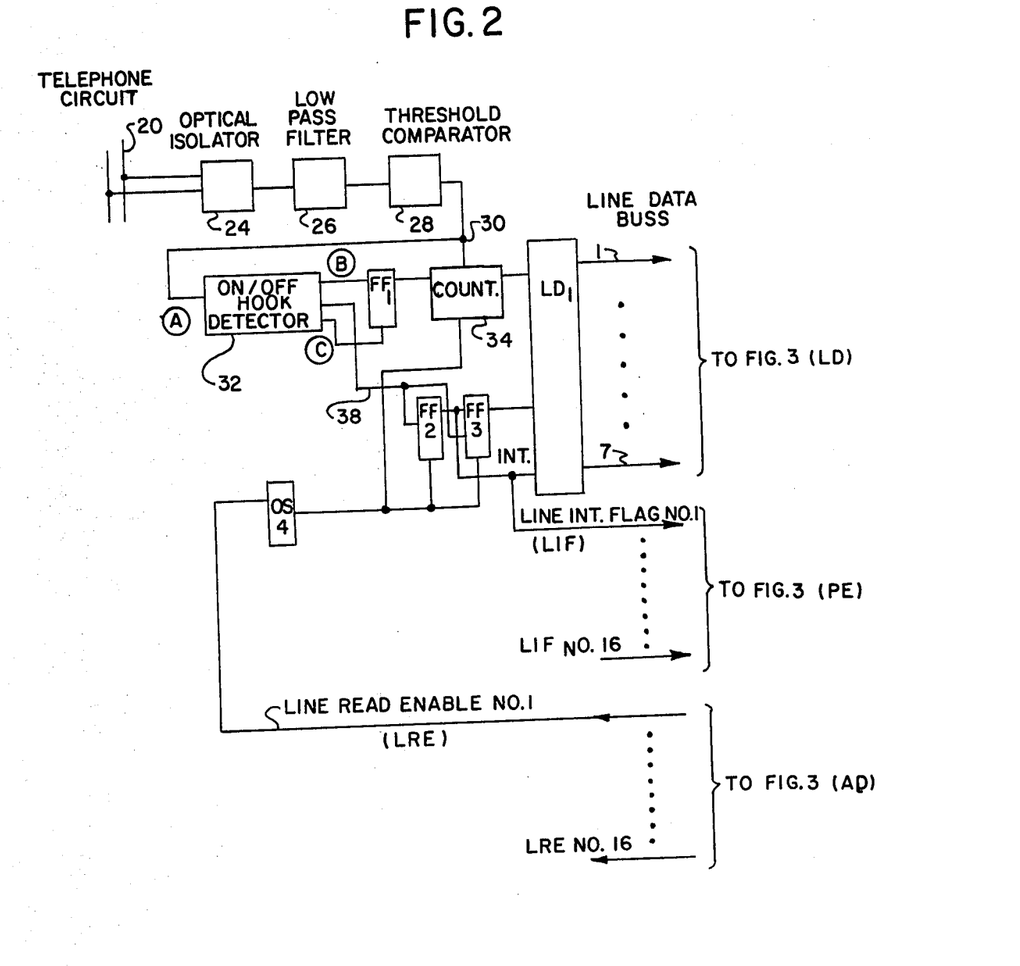
FIG. 2 is a block diagram of one of the line monitor units of the system shown in FIG. 1.
Figure 5A:
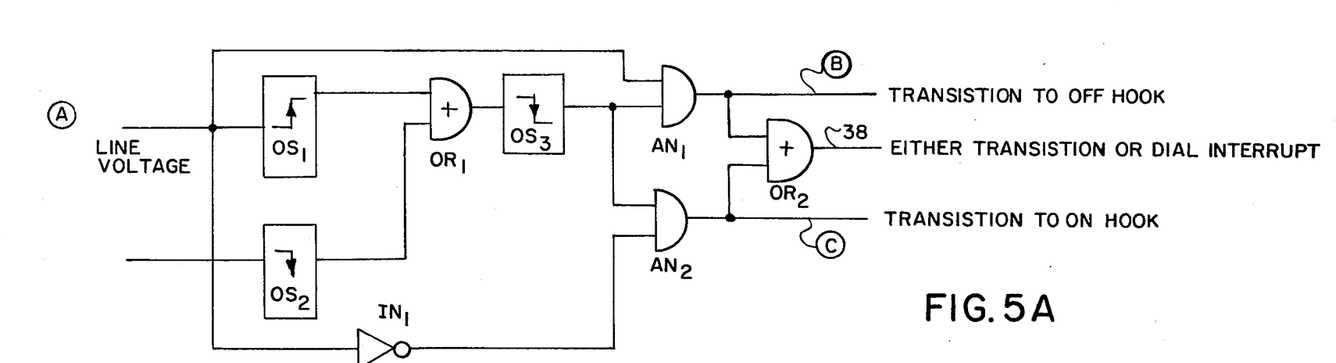
FIG. 5A is a detailed schematic drawing and FIG. 5B is a timing diagram of the on/off hook detector of the line monitor unit shown in FIG. 2.
Figure 5B:
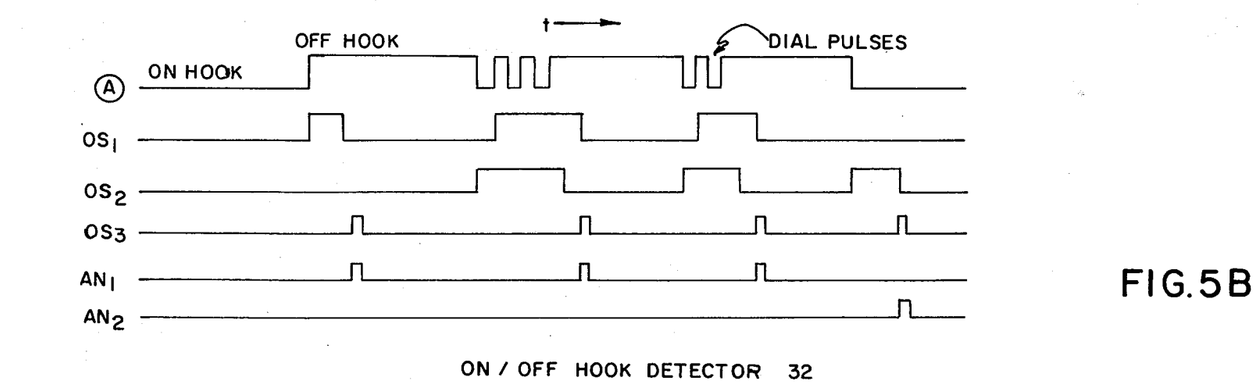

The monitoring operation of a TLMU 22 is best understood with reference to FIGS. 2 and 5. When a telephone line 20 is inactive, no current flows in the circuit and the voltage between the two conductors is at its highest value. Typically, this value will be between 48 and 50 volts D.C. This condition is called "on hook". When the telephone receiver (not shown) is lifted from its cradle, the telephone line 20 becomes active, a condition called "off hook", and the voltage will drop to its lowest value due to the flow of D.C. current in the line. Depending upon where the monitor point is chosen, the off hook voltage can be as low as 4 volts or as high as 32 to 35 volts. Current sensing techniques well known to those skilled in the art can also be used to determine the on/off hook status.

With reference to FIG. 2, each TLMU 22 includes an optical isolator 24 (for example, Hewlett Packard No. 6N139) which provides electrical isolation between the telephone line 20 and the TLMU 22. The output of the isolator 24 is a voltage representative of the current flow in, or the voltage across, the telephone line 20. This voltage will contain the A.C. voice signal, when present, and other unwanted A.C. signals. A low pass filter 26 is used to remove these unwanted A.C. signals and to pass a signal representative of the status of the telephone line 20 to a threshold comparator 28, which produces a signal whose voltage is compatible with the logic circuits used, and is at a high logic level for the off hook condition and at a low logic level for the on hook condition. The output of the threshold comparator 28 is fed to a junction point 30 to which an on/off hook detector 32 and a binary counter 34 are connected. As shown in FIGS. 5A and 5B, the on/off hook detector 32 comprises one shot oscillators OS1, OS2 and OS3, OR gates OR1 and OR2 and AND gates AN1 and AN2 and functions to provide the following information: (1) a pulse at the transition from on to off hook, (2) a pulse at the transition from off to on hook, (3) a pulse at either transition and (4) a pulse at the end of each "dialed digit". The term "dialed digit" as used in this specification shall mean each telephone number digit as represented by a pulse train created by a rotary dialed telephone system or as represented by a tone burst created by a tone encoder such as the AT&T "Touch Tone" system. The output of the AND gate AN1, which is representative of an on-to-off hook transition is used to set a flip-flop FF1 (see FIG. 2) when the telephone circuit 20 goes active. All further set commands to the flip-flop FF1 are ignored. The output of the AND gate AN2, which is representative of an off-to-on hook transition resets the flip-flop FF1. Thus the state of the flip-flop FF1 is an indication of the on/off hook status of the telephone circuit 20 being monitored. The output of OR gate OR2 which is representative of a change in status (on-to-off hook, off-to-on hook or dialed digit) sets an interrupt register comprising flip-flops FF2 and FF3 to produce a signal on a flag interrupt line (LIF) associated with that particular TLMU 22.

When the flip-flop FF1 is set to the state indicating an off hook condition of the telephone line 20, it conditions the binary counter 34 so that it can count all subsequent rotary dialed pulses. The output of the binary counter 34 is connected to line data line drivers LDI where the data can be accessed by a line read enable signal (LRE) in the manner described herein below. The circuitry in FIG. 5A also indicates how the end of a rotary dialed digit is detected. The ratio of off-hook to on-hook times of a rotary dialed pulse train is specified to a very close tolerance by the telephone companies. One-shot oscillators OS1 and OS2 are both adjusted so that they will not time out during a rotary dialing sequence. At the end of a dialed digit, one-shot oscillator OS3 will produce a pulse which AND gate AN1 and OR gate OR2 will pass on line 38 to the interrupt flip-flops FF2 and FF3. The pulse sets flip-flop FF2 to produce the line interrupt flag (LIF). Flip-flop FF3 will be set only if there is an error condition as described hereinbelow.

If the monitoring system is being used with tone burst signaling, then the binary counter 34 may be replaced by a tone decoder (not shown). An illustrative tone decoder useful with the apparatus of the present invention is the Rockwell Multi-Frequency Receiver No. CRC8030 which is described in the Rockwell International Inc. Applications Note No. 1978/523-10011812-201F2J. The on/off hook detector 32 described above is still used when the line goes on and off hook at the beginning and end of a call. The tone decoder will be used to produce an end of digit signal which replaces the signal on line 38.

Figure 3:
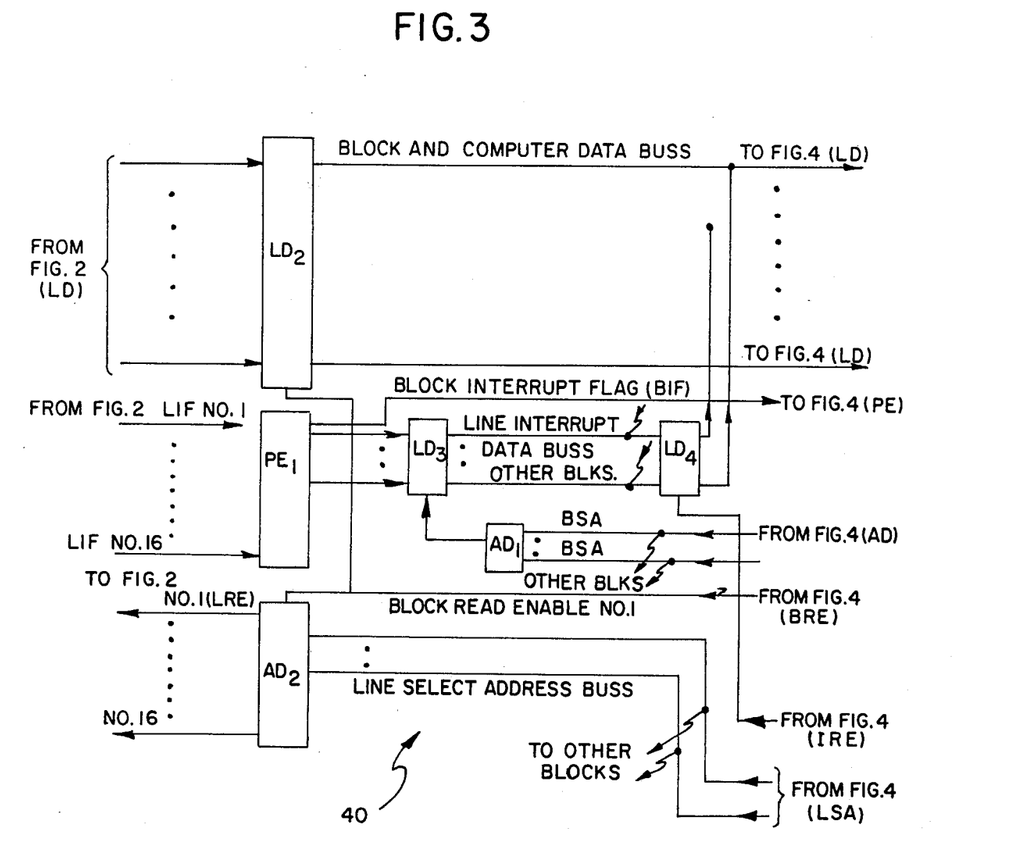
FIG. 3 is a block diagram of one of the block control units of the system shown in FIG. 1.

Referring now to FIG. 3, the signal on the line interrupt flag (LIF), which is representative of a change in status of a TLMU 22 is sent to a priority encoder PE1 of a block control unit (BCU) 40. Up to n TLMUs are connected to each BCU 40 of the system (n=8, 16, 24 etc. with 16 the preferred number). The priority encoder PE1 produces a binary value (using parallel bits) representative of that TLMU 22 interrupting. The priority encoder PE1 also produces a block interrupt flag signal (BIF) of its own (no matter which TLMU 22 interrupts) which is connected to a master control unit (MCU) 42 (see FIG. 4). Up to n block control units are connected to each MCU of the system (n=18, 16, 24 etc. with 16 the preferred number). If there is no other interrupt present at the MCU 42, the block interrupt will be serviced. If any other interrupts are present, either at the block or master level, the interrupts will be serviced on a preassigned sequential priority. Logic within each TLMU 22 (FF3 will be set if an interrupt occurs while FF2 is set, see FIG. 2) indicates if a new change in condition occurs before the first interrupt has been serviced, as this is an error condition.

Figure 4:
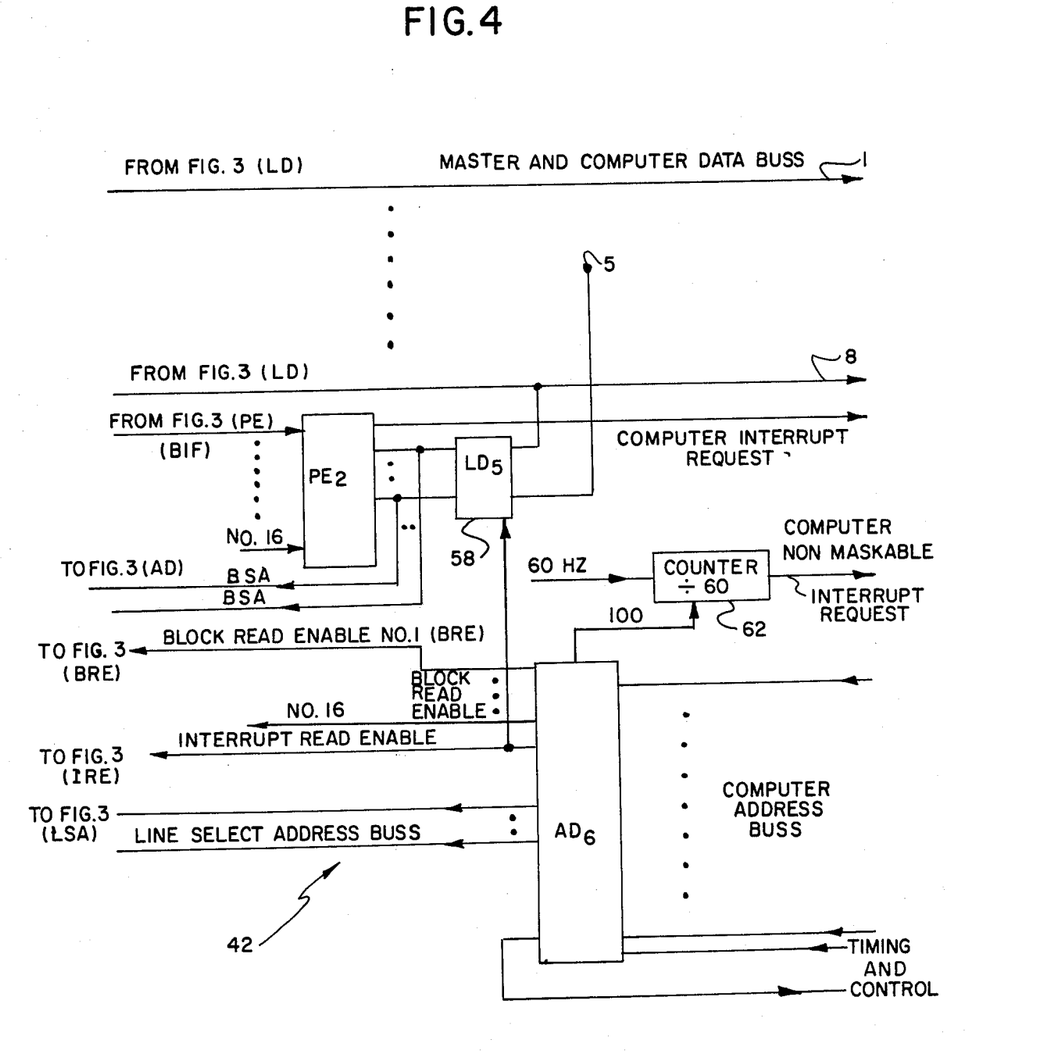
FIG. 4 is a block diagram of the master control unit of the system shown in FIG. 1.

Referring now to FIG. 4, when the MCU 42 receives a block interrupt signal (BIF), the MCU priority encoder PE2 produces a binary value (usually of 4 bits, but could be expanded) that has two pruposes. It forms the high order address bits of the interrupt address data to indicate which of the n block control units is causing the interrupt and it is also used as the block select address (BSA). This block select address BSA when decoded by the address decoder (AD1) of FIG. 3 will enable the line drivers LD3 so that the data in the priority encoder PE1 can be used as the low order bits of the interrupt address data.

An interrupt request from the PE priority encoder PE2 of the MCU 42 is sent to a central processing unit (CPU) 50. The CPU 50 issues, in accordance with a stored program commonly known in the art as an interrupt service routine, a read command on the CPU address buss to an address decoder AD6 representative of the interrupt address data. When the address decoder AD6 senses a request for data representative of the interrupt address data, it provides an interrupt read enable signal (IRE) which enables the line drivers LD4 and LD5 to present this data on the central processing unit data buss to the CPU 50. The program in the CPU 50 will use this data to form a new address representative of the TLMU data. The CPU 50 will then issue a read command to this address to obtain the information contained within the TLMU. When this read command is issued by the CPU 50, the following actions take place with reference to FIGS. 1, 2, 3 and 4.

MCU address decoder AD6 will issue a block read enable signal (BRE) representative of the block control unit issuing the interrupt now being serviced. This block read enable signal conditions the line read address decoder AD2 so that it will be active and it enables the block data line drivers LD2 of FIG. 3 so that data to be supplied by the TLMU can be passed on to the CPU data buss.

The line read address decoder AD2 having been conditioned by the block read enable signal (BRE) will decode the low order line select address signals as supplied by the master control unit address decoder AD6 and produce a line read enable signal (LRE) to the TLMU 22 that produced the original interrupt. This line read enable signal (LRE) has three functions. During its active time it enables the TLMU line drivers LD1 so that data representative of the dialed digit, hook status, interrupt status and error status will be placed on the line data buss of FIGS. 2 and 3 where it will be passed on to the block data buss of FIGS. 3 and 4 by the block control line drivers LD2. The master control unit 42 merges the block data buss with the CPU data buss as shown in FIGS. 3 and 4. At the end of the active time of the line read enable signal (LRE), a one-shot oscillator OS4 produces a signal to reset the interrupt logic (FF2 and FF3) and to reset the dial pulse counter 34 so that they will be ready for the next activity on the telephone circuit.

The CPU 50 shown in FIG. 1 can be any micro or mini processor system i.e. a stored program processing unit with associated memory and control program. A commercial example is the Ohio Scientific Model 500. This is an eight-bit microcomputer. A sixteen-bit microcomputer such as the Digital Equipment Corp. LSI-11 can also be used. When a sixteen-bit microcomputer is used, then the computer can read both the interrupt address that identifies the TLMU 22 and the TLMU data itself with one read operation. The same master/-block interrupt structure is used as in the eight-bit system except that when the block is enabled to put the low order interrupt address on the computer data buss, it also puts the line data on the computer data buss at the same time.

If only sixteen or thirty telephone lines are used, the block control may be eliminated. For sixteen lines, only one sixteen line priority encoder and one line address decoder are used and the interrupt address is the low four order bits of the interrupt address data word. When thirty lines are required, two sets of priority encoders and line address decoders and all eight bits are used as two groups of four bits for line address identification.

For any monitoring of the telephone line activity to be meaningful, it is necessary for the central processing unit that is gathering data from the individual telephone line monitor units to record the time at which such activity takes place. This master time clock, which forms no part of the present invention, can be a chronological instrument that presents the day and time of day to a particular computer memory location or it can be a timer that presents a trigger to the computer so that the computer can calculate the required time information. It is a function of the computer program to match the timing information with the information presented to the computer by the apparatus of this invention. The following are three examples of techniques that are all applicable to this time-keeping function.

TECHNIQUE 1

As shown in FIG. 4, this technique uses a power line frequency unit with a binary counter 62 and CPU addressed gating (100) to enable the counter. When on, the unit provides an interrupt to the CPU that can interrupt at any time. The CPU uses these interrupts to keep track of the time, day and year by means of well known programming techniques.

TECHNIQUE 2

A 50 or 60 Hz. line frequency as above but uses additional counters to keep track of time and date. The CPU now reads these locations as if they were memory and does not have to do any calculations.

TECHNIQUE 3

This is the same as method 2 above, only the line frequency signal is replaced by a crystal oscillator and the entire clock circuit is battery operated. Now the clock remains correct even when there is a power failure.

The input from an operator to set the clock (time and date) and select the modes of operation can come from, for example, a keyboard and keyboard decoder with a PIA (parallel interface adapter) and a computer program to interpret the data signals or from an ASCII serial device such as a TTY or a scope terminal and ACIA (asyncronous communications interface adapter) again with an appropriate computer program.

It is also necessary to have a means to report the gathered data either as the call is completed or at some selected time at the convenience of the operator. This output can be in a man-readable form from a printer or scope terminal or it may be in a machine-readable format, for example, in a magnetic storage media, or it might be transmitted via standard data communications techniques to another central processing unit for further processing. FIG. 1 shows how any of these commercially available computer peripherals 60 which are controlled by standard computer programming techniques would be attached to the CPU buss structure.

The invention has been described in detail with particular reference to a preferred embodiment thereof, but it will be understood that variations and modifications can be effected within the spirit and scope of the invention. For example the individual telephone line monitor units could be replaced by appropriately programmed microprocessor chips. Furthermore, in a broader context, the monitoring system of the present invention can be readily adapted to monitor any network of stations which provide current or voltage transistions indicative of a change of status in such stations. Such an adaption simply requires an appropriate status detection mechanism (replacing the on/off hook detector 32 and counter 34) be connected to the line drivers LD1 and flip-flops FF2 and FF3 of FIG. 2.

I claim:

1. In monitoring apparatus for monitoring a plurality of telephone lines, the apparatus including a central processing unit operative under an appropriate program including an interrupt service routine to process data presented thereto, the improvement comprising:
   (a) a plurality of telephone monitor units each including (i) a detector means connected to a telephone line for sensing the status of said line and for producing signal pulses whenever changes in the status occur, (ii) storage means responsive to said signal pulses for temporarily storing binary data representative of the change in status information and for providing a first interrupt signal indicating that a change in status has occurred, and (iii) first transfer means for transferring the binary data from said storage means to the central processing unit; and
   (b) at least one control unit, said control unit including (i) a priority encoder connected to said telephone monitor units, said priority encoder being activated upon receipt of said first interrupt signal to produce a binary value representative of that telephone monitor unit interrupting and to provide on an electrical connection to the central processing unit a CPU interrupt signal indicating that information from an individual telephone line is available, (ii) second transfer means for transferring the binary data from said priority encoder to the central processing unit and (iii) an address decoder responsive to a read command issued by the central processing unit in accordance with the interrupt service routine upon receipt of said CPU interrupt signal for enabling said first and second transfer means to transfer the binary data from said storage means and said priority encoder to the central processing unit.

2. The improvement according to claim 1 wherein said status information comprises:
   (a) an on-to-off hook transition;
   (b) an off-to-on hook transition;
   (c) the completion of a dialed digit; and
   (d) an indication that an error in collecting information from an individual telephone line monitor unit has occurred.

3. In telephone monitoring apparatus for monitoring a plurality of telephone lines, the apparatus including a central processing unit operative under an appropriate program including an interrupt service routine to process data presented thereto, the improvement comprising:
   (a) a plurality of telephone monitor units each including (i) a detector means connected to a telephone line for sensing the status of said line and for producing signal pulses whenever changes in the status occur, (ii) storage means responsive to said signal pulses for temporarily storing binary data representative of the change in status information and for providing a first interrupt signal indicating that a change in status has occurred, (iii) a line data buss, and (iv) first transfer means for transferring the binary data from said storage means to the line data buss;
   (b) a plurality of block control units each including (i) first priority encoder means connected to a predetermined number of telephone monitor units, said first priority encoder means being activated upon the receipt of said first interrupt signal to produce a binary value representative of the telephone monitor unit interrupting and to provide a second interrupt signal indicating that information from that block is available, (ii) second transfer means for transferring the binary data from said first priority encoder to the central processing unit, (iii) third transfer means for transferring the binary data on the line data buss to the control processing unit and (iv) a block data buss; and
   (c) a master control unit, said master control unit including (i) second priority encoder means connected to each of said block units, said second priority encoder being activated upon the receipt of said second interrupt signal to produce a binary value representative of the block control unit generating the second interrupt signal and to provide on an electrical connection to the central processing unit a CPU interrupt signal indicating that information from an individual telephone line is available, said binary value providing (a) a block select address signal that enables said second transfer means and (b) binary data on the block data buss representative of the block control unit to which the interrupting telephone monitor unit belongs, (ii) fourth transfer means for transferring the binary data on the block data buss to the central processing unit, (iii) fifth transfer means for transferring the binary data from said second priority encoder to the central processing unit, and (iv) an address decoder, responsive to a read command issued by the central processing unit in accordance with the interrupt service routine upon the receipt of said CPU interrupt signal for enabling said fourth and fifth transfer means to transfer binary data from the block data buss and the master control priority encoder to the central processing unit and responsive to a second read command signal from the central processing unit to enable the first and third transfer means to transfer binary data from said storage means to the central processing unit.

4. In monitoring apparatus for monitoring a plurality of stations which provide signal pulses whenever changes in the status of such stations occur, the apparatus including a central processing unit operative under an appropriate program including an interrupt service routine to process data presented thereto, the improvement comprising:

(a) a plurality of station monitor units each including (i) a detector means connected to an individual station for sensing the status of said station and for producing signal pulses whenever changes in the status occur, (ii) storage means responsive to said signal pulses for temporarily storing binary data representative of the change of status information and for providing a first interrupt signal indicating that a change in status has occurred, and (iii) first transfer means for transferring the binary data from said storage means to the central processing unit; and (b) at least one control unit, said control unit including (i) a priority encoder connected to said station monitor units, said priority encoder being activated upon receipt of said first interrupt signal to produce a binary value representative of that station monitor unit interrupting and to provide on an electrical connection to the central processing unit a CPU interrupt signal indicating that information from an individual station is available, (ii) second transfer means for transferring the binary data from said priority encoder to the central processing unit and (iii) an address decoder responsive to a read command issued by the central processing unit in accordance with the interrupt service routine upon receipt of said CPU interrupt signal for enabling said first and second transfer means to transfer the binary data from said storage means and said priority encoder to the central processing unit.

* * * * *